(12) United States Patent
Vigil

(10) Patent No.: US 8,991,642 B2
(45) Date of Patent: Mar. 31, 2015

(54) WHEEL LIFT CONTAINER

(76) Inventor: Aurelio Vigil, Miami, FL (US)

( * ) Notice: Subject to any disclaimer, the term of this patent is extended or adjusted under 35 U.S.C. 154(b) by 512 days.

(21) Appl. No.: 12/351,996

(22) Filed: Jan. 12, 2009

(65) Prior Publication Data

US 2010/0178145 A1    Jul. 15, 2010

(51) Int. Cl.
*B60P 3/12* (2006.01)
*B65D 90/12* (2006.01)
*B60P 1/00* (2006.01)
*B60P 1/28* (2006.01)

(52) U.S. Cl.
CPC ............... *B60P 3/125* (2013.01); *B65D 90/12* (2013.01); *B60P 1/00* (2013.01); *B60P 1/286* (2013.01)
USPC ......................................... 220/636; 220/1.5

(58) Field of Classification Search
CPC .... B65D 88/10; B65D 88/128; B65D 88/129; B65D 88/121; B65D 88/12; B65D 25/24; B65D 25/20; B65D 25/22; B65D 90/18; B65D 90/12; B60P 3/125; B60P 3/12

USPC ............ 220/636, 729; 16/48, 47, 46; 280/482
IPC .................................. B65D 25/24,90/18, 90/12
See application file for complete search history.

(56) References Cited

U.S. PATENT DOCUMENTS

| | | | | | |
|---|---|---|---|---|---|
| 2,026,235 | A | * | 12/1935 | Korte | 280/87.01 |
| 2,763,491 | A | * | 9/1956 | Shafer, Jr. | 280/35 |
| 3,007,584 | A | * | 11/1961 | Frederick | 414/13 |
| 3,144,141 | A | * | 8/1964 | Tantlinger et al. | 220/23.83 |
| 3,643,993 | A | * | 2/1972 | Asadurian | 294/68.26 |
| 5,186,330 | A | * | 2/1993 | McClure | 206/508 |
| 5,356,031 | A | * | 10/1994 | Jondelius | 220/610 |

\* cited by examiner

*Primary Examiner* — Robert J Hicks
(74) *Attorney, Agent, or Firm* — James A. Italia; Italia IP

(57) ABSTRACT

A cargo container includes a body comprising or including a flat bottom or a bottom substantially flat at regions corresponding to the distances at which vehicle tires are spaced on an axle of a typical vehicle to be towed, whereon a plurality of surfaces which extend out of the body bottom or flat regions are disposed to engage and be retained by the tow truck wheel lift assembly draw bar and the extension (when deployed) and permit the cargo container to be lifted, moved or otherwise retained by the tow truck.

1 Claim, 1 Drawing Sheet

WHEEL LIFT CONTAINER

FIELD OF THE INVENTION

This application relates generally to transportable cargo containers. More specifically, this application relates to cargo containers adapted to be retained by a tow truck wheel lift assembly and thereby transported behind the tow truck.

BACKGROUND

Frequently trucks, including tow trucks, include a vehicle towing assembly designed to engage the lower portion of the vehicle tires of one axle with a bar or portions of a front bar extending across a width across the tires, and engaging the lower rear of the tires with a further rear bar or bar portions also extending across the with across the tires so that the when the front and rear bar or bar portions are raised, the vehicle tires rest on and partially between the front and rear bar or bar portions.

It is desirous to transport material other than or in addition to vehicles having tires mounted on axle(s). However, the addition of the towing assembly or the construction of the tow truck generally precludes the inclusion of a place to receive such material, and often precludes the inclusion of a facility to allow the connection of a towed trailer. However, even if the ability to tow a trailer is provided, it is often not desirable due to do so. Thus, despite the capacity of tow trucks to move substantial vehicles, their utility beyond towing vehicles is noticeably marginal at best.

SUMMARY

According to one embodiment of the present invention, a cargo container includes a body comprising or including a flat bottom or a bottom substantially flat at regions corresponding to the distances at which vehicle tires are spaced on an axle of a vehicle to be towed, whereon a plurality of surfaces which extend out of the body bottom or flat regions are disposed to engage the tow truck wheel lift assembly draw bar and the extension (when deployed) and permit the cargo container to be lifted, moved or otherwise retained by the tow truck.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
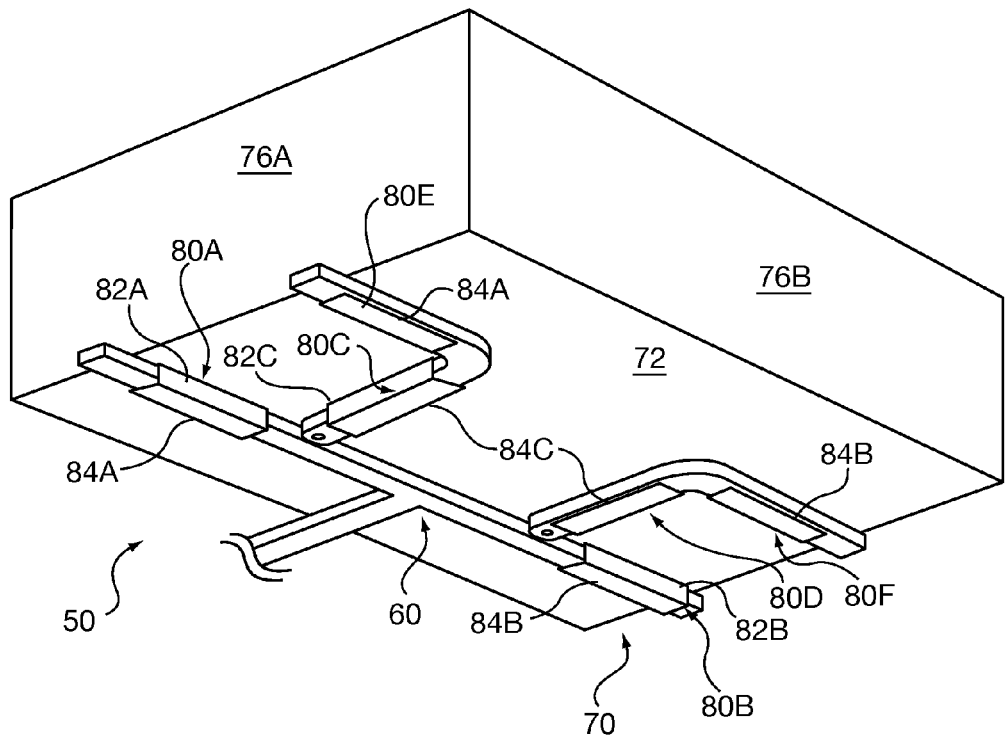
FIG. 1 is perspective view of a one embodiment according to the present invention.

An exemplary embodiment 50 is shown in FIG. 1, wherein a wheel lift assembly 60, typically attached to the rear of another vehicle, e.g. a tow truck, extends under an exemplary container 70 and engages members 80A, 80B attached thereto. In the embodiment 50, the members 80A, 80B comprises two flanges formed by sections of angle iron having corresponding edges 82A, 82B of each pair fastened (e.g. by welding) to extend out from the bottom 72 of the container 70. The members 80A, 80B provide outwardly facing surfaces approximating the spacing of a portion of the automobile tires typically engaged and carried by the wheel lift assembly 60. The unattached ends 84A, 84B of the angle iron sections face outward from each other to form the flange ends which further engages the wheel lift assembly 60, especially if and when upward (relative to the wheel lift assembly 60) forces or motion is encountered. However, alternate embodiments without the ends (e.g. 84A, 84B) are within the scope of the present invention.

The embodiment 50 of FIG. 1 may also include an additional pair of members 80C, 80D which are mounted to the bottom 72 and extend outwardly therefrom with each element of the pair of members 80C, 80D being fastened between a pair of members (e.g., 80A and 80E, or between a pair of members 80B and 80F). Surfaces of the members 80C, 80D are orthogonal to the bottom 72, thus providing relatively facing surfaces spaced apart at a distance approximating the distance between facing sides of tires on an axle of a vehicle carried by the wheel lift assembly 60. The members 80C, 80D may also be fabricated by angle iron or equivalent and further include unattached ends which form flange ends that are disposed to face each other and provide further engagement of the wheel lift assembly 60.

Figures 2, 3:
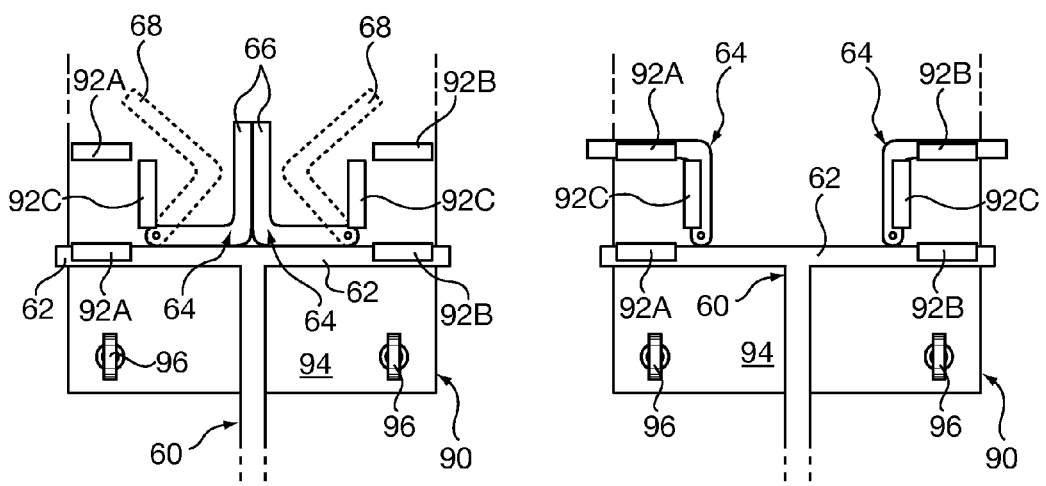
FIG. 2 is an upward planar view of the container according to a further embodiment showing engagement with a typical wheel lift assembly at an initial stage and partially deployed stage of wheel lift assembly engagement.
FIG. 3 is an upward planar view of the container according to the embodiment of FIG. 2 showing a fully deployed wheel lift assembly engagement therewith.

In operation, the embodiments of a container such as the containers 70 or 90 according to the present invention are retained by the wheel lift assembly 60 by first introducing the retracted or stowed wheel lift assembly 60 between pairs of members 80A, 80B; 80C, 80D; and 80E, 80F until contact is made therewith, as shown in a container 90 of FIGS. 2 and 3 illustrating the subsequent engagement with a typical tow truck wheel lift assembly, 60. In the container 90, pairs of members 92A, 92B are disposed to extend out of the substantially planar container 90 bottom 94 each have a surface which is initially engaged by a draw bar 62 of the assembly 60 and substantially lying on the line defined by the confronting edge of the draw bar 62. The typical wheel lift assembly includes additional "L" arms 64 having an end pivotally connected to the drawbar 62 to position the "L" arms at a distance substantially corresponding to a typical spacing between wheels on an axle of a vehicle to be towed, and are shown in FIG. 2 in a stowed position 66 and a partially deployed position 68.

When fully deployed as shown in FIG. 3, the end of the "L" arms 64 not pivotally connected to the drawbar 62 become substantially parallel to the drawbar 62 and capture the members 92A and 92B therebetween by engaging the outward facing surfaces of the members 92A and 92B. Accordingly, the container 90 is retained by the wheel lift assembly 60 in lateral directions (in the plane of the drawings) as well as being lifted (into the plane of the drawing). Moreover, an additional facing pair of members 92C is mounted on the bottom 94 at a relative distance from the drawbar 62 between the distances of the members 92A, 92B relative to the drawbar 62, and having facing surfaces spaced a distance corresponding to the facing tire surfaces which the wheel lift assembly is expected to engage, or at a distance which permits the "L" arm to fully deploy as shown in FIG. 3. Additionally, the members 92A, 92B, 92C may further include flange ends (similar to 84A, 84B, 84C of FIG. 1) to provide enhanced retention in the wheel lift assembly.

To disengage, the container is lowered to be supported on the ground, e.g. by wheels 96 or other supports mounted to the bottom 94, and the "L" arms (or corresponding element in the wheel lift assembly) are withdrawn into a position which permits the wheel lift assembly 60 to be moved away from the container, e.g. 70 and 90.

The embodiments according to the present invention are useful with other towing or wheel lift assemblies which engage opposing surfaces with or without the "L" arms. Furthermore, the flange surfaces of the members 80A . . . 80F and equivalents in other embodiments according to the present invention may be other than continuous and/or flat surfaces, such as separated segments thereof, and may also be formed in various manners, e.g. as contiguous portions of a single member. Moreover, since the upper surfaces of the wheel lift assemblies which engage tires of the vehicles to be towed are likely to be substantially of the same plane, so to should the bottom 94 (or 72) surfaces be, or include portions which are substantially co-planar at least in the regions having the members 80A, 80B for best stability.

The container including the bottom 72 or 94 may comprise a simple platform or a structure having one or more removable or permanent sidewalls (e.g. 76A, 76B of FIG. 1) and/or a top to provide an enclosed volume, and be appropriately sized to carry material as desired.

Alternatively stated, the container 70 comprises a body including a bottom 72, a first sidewall 76A projecting upwardly from the bottom 72, and a second sidewall 76B projecting upwardly from the bottom 72. A first principal trough socket (i.e., the member 80A) and a second principal trough socket (i.e., the member 80B) are each fixed to the bottom 72 on a side of the bottom 72 opposite that of the first and second sidewalls 76A, 76B. The first and second principal trough sockets (80A, 80B) each open away from the second sidewall 76B. Each of the first and second principal trough sockets (80A, 80B) includes a bottom trough socket surface parallel to the bottom 72 of the container 70 and an end trough socket surface perpendicular to the bottom 72 of the container 70.

A first secondary trough socket 80C and a second secondary trough socket 80D are each fixed to the bottom 72 of the container 70 on the side of the bottom 70 opposite that of the first and second sidewalls 76A, 76B. The first and second secondary trough sockets 80C, 80D each include a bottom trough socket surface parallel to the bottom 72 of the container 70 and an end trough socket surface perpendicular to the bottom 72 of the container 70. The first and second secondary trough sockets 80C, 80D open in opposite directions to one another, both opening perpendicularly to the direction of opening of the first and second principal trough sockets (80A, 80B).

First and second tertiary trough sockets 80E, 80F are fixed to the bottom 72 of the container 70 on the side of the bottom 72 opposite that of the first and second sidewalls 76A, 76B. The first and second tertiary trough sockets 80E, 80F each open in a direction opposite that of the first and second principal trough sockets 80A, 80B, and each include a bottom trough socket surface parallel to the bottom 72 of the container 70 and an end trough socket surface perpendicular to the bottom 72 of the container 70.

The first and second principal trough sockets 80A, 80B, the first and second secondary trough sockets 80C, 80D, and the first and second tertiary trough sockets 80E, 80F are described as sockets merely because they receive portions of the drawbar 60, as described above.

The first and second principal trough sockets 80A, 80B, the first and second secondary trough sockets 80C, 80D, and the first and second tertiary trough sockets 80E, 80F are each open at two ends thereof such that each can slidably receive therein a portion of the drawbar 60 of the tow truck, where the portion of the drawbar 60 is longer than its associated first or second principal trough socket 80A or 80B, its associated first or second secondary trough socket 80C or 80D, or its associated first or second tertiary trough socket 80E, 80F.

What is claimed is:

1. A container, comprising:
   a body including a bottom, a first sidewall projecting upwardly from the bottom, and a second sidewall projecting upwardly from the bottom;
   a first principal trough socket and a second principal trough socket fixed to the bottom on a side of the bottom opposite that of the first sidewall and the second sidewall, wherein the first and second principal trough sockets each open away from the second sidewall and each include a bottom trough socket surface parallel to the bottom of the trough socket container and an end trough socket surface perpendicular to the bottom of the trough socket container;
   a first secondary trough socket and a second secondary trough socket each fixed to the bottom on the side of the bottom opposite that of the first sidewall and the second sidewall, wherein
      the first and second secondary trough sockets each include a bottom trough socket surface parallel to the bottom of the container and an end trough socket surface perpendicular to the bottom of the container, and
      the first and second secondary trough sockets open in opposite directions to one another, both opening perpendicularly to the direction of opening of the first and second principal trough sockets; and
   first and second tertiary trough sockets fixed to the bottom on the side of the bottom opposite that of the first and second sidewalls, wherein the first and second tertiary trough sockets each open in a direction opposite that of the first and second principal trough sockets and each include a bottom trough socket surface parallel to the bottom of the trough socket container and an end trough socket surface perpendicular to the bottom of the container, wherein
   the first and second principal trough sockets, the first and second secondary trough sockets, and the first and second tertiary trough sockets are each open at two ends thereof such that each can slidably receive therein a portion of a drawbar of a tow truck, where the portion of the drawbar is longer than its associated first or second principal trough socket, its associated first or second secondary trough socket, or its associated first or second tertiary trough socket.

* * * * *